US008688553B1

(12) United States Patent
Weiss et al.

(10) Patent No.: US 8,688,553 B1
(45) Date of Patent: Apr. 1, 2014

(54) METHOD AND SYSTEM FOR USING CONSUMER FINANCIAL DATA IN PRODUCT MARKET ANALYSIS

(75) Inventors: Benjamin Weiss, Portola Valley, CA (US); Todd M. Fitch, Santa Clara, CA (US); John Reed Flora, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 690 days.

(21) Appl. No.: 12/059,878

(22) Filed: Mar. 31, 2008

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | |
|---|---|---|---|
| 5,353,218 A | 10/1994 | De Lapa et al. | |
| 5,754,938 A * | 5/1998 | Herz et al. | 725/116 |
| 5,819,285 A | 10/1998 | Damico et al. | |
| 6,341,353 B1 | 1/2002 | Herman et al. | |
| 6,363,488 B1 * | 3/2002 | Ginter et al. | 726/1 |
| 6,611,811 B1 | 8/2003 | Deaton et al. | |
| 6,678,685 B2 | 1/2004 | McGill et al. | |
| 6,918,131 B1 | 7/2005 | Rautila et al. | |
| 7,403,906 B2 * | 7/2008 | Coleman | 705/14.66 |
| 7,505,913 B2 | 3/2009 | Tobin | |
| 7,668,747 B2 | 2/2010 | Murphy et al. | |
| 7,783,532 B2 | 8/2010 | Hsu et al. | |
| 7,877,402 B1 | 1/2011 | Weiss et al. | |
| 2001/0003099 A1 * | 6/2001 | Von Kohorn | 463/40 |
| 2001/0014868 A1 | 8/2001 | Herz et al. | |
| 2001/0044751 A1 * | 11/2001 | Pugliese et al. | 705/26 |
| 2002/0002500 A1 | 1/2002 | Takahashi | |
| 2002/0019764 A1 | 2/2002 | Mascarenhan | |
| 2002/0040321 A1 | 4/2002 | Nicholson | |
| 2002/0077892 A1 | 6/2002 | Goring | |
| 2002/0082620 A1 | 6/2002 | Lee | |

(Continued)

FOREIGN PATENT DOCUMENTS

| | | |
|---|---|---|
| GB | 2 430 297 | 3/2007 |
| WO | WO-01/040980 | 6/2001 |
| WO | WO-2004/055701 | 7/2004 |
| WO | WO-2005/122020 | 12/2005 |

OTHER PUBLICATIONS

Dalit, "Method and System for Sharing Marketing Devices," U.S. Appl. No. 12/960,764, filed Dec. 6, 2010.

(Continued)

*Primary Examiner* — Behrang Badii
*Assistant Examiner* — Daniel L Greene
(74) *Attorney, Agent, or Firm* — Hawley Troxell Ennis & Hawley LLP; Philip McKay

(57) ABSTRACT

A system and method for product market analysis using consumer financial data obtains financial data associated with a given consumer. At least part of the consumer financial data is then stored by the process for product market analysis using consumer financial data, or another party/application, typically in accounts/locations associated with the given consumer. An electronic media based marketing device is then provided by a product marketer, the electronic media based marketing device being capable of activation. When a consumer activates the electronic media based marketing device at least part of the consumer financial data associated with the consumer is transferred to the product marketer. As a result, the product marketer obtains significant amounts of information for market analysis purposes such as creating a potential consumer profile and determining a target market for the given product an/or service.

24 Claims, 2 Drawing Sheets

(56) References Cited

U.S. PATENT DOCUMENTS

| | | |
|---|---|---|
| 2002/0138345 A1 | 9/2002 | Dickson et al. |
| 2002/0169664 A1 | 11/2002 | Walker et al. |
| 2002/0174011 A1 | 11/2002 | Sanchez et al. |
| 2003/0009402 A1 | 1/2003 | Mullen et al. |
| 2003/0018523 A1 | 1/2003 | Rappaport et al. |
| 2003/0093287 A1 | 5/2003 | Lowery |
| 2003/0105689 A1 | 6/2003 | Chandak et al. |
| 2003/0158844 A1 | 8/2003 | Kramer et al. |
| 2003/0195806 A1 | 10/2003 | Willman et al. |
| 2003/0212595 A1 | 11/2003 | Antonucci |
| 2003/0233276 A1 | 12/2003 | Pearlman et al. |
| 2004/0024638 A1* | 2/2004 | Restis .................. 705/14 |
| 2004/0049452 A1 | 3/2004 | Blagg |
| 2004/0054577 A1* | 3/2004 | Inoue et al. .......... 705/14 |
| 2004/0056101 A1 | 3/2004 | Barkan et al. |
| 2004/0140361 A1 | 7/2004 | Paul et al. |
| 2005/0171841 A1 | 8/2005 | Prorock et al. |
| 2005/0171955 A1 | 8/2005 | Hull et al. |
| 2005/0256756 A1 | 11/2005 | Lam et al. |
| 2006/0143183 A1 | 6/2006 | Goldberg et al. |
| 2006/0212355 A1 | 9/2006 | Teague et al. |
| 2006/0224451 A1 | 10/2006 | Kerschbrock et al. |
| 2006/0229946 A1 | 10/2006 | Scroggie et al. |
| 2006/0282310 A1 | 12/2006 | Burch |
| 2007/0050258 A1 | 3/2007 | Dohse |
| 2007/0094042 A1* | 4/2007 | Ramer et al. .......... 705/1 |
| 2007/0094114 A1 | 4/2007 | Bufford et al. |
| 2007/0106536 A1* | 5/2007 | Moore .................. 705/3 |
| 2007/0118394 A1* | 5/2007 | Cahoon ................ 705/1 |
| 2007/0121843 A1 | 5/2007 | Atazky et al. |
| 2007/0129998 A1 | 6/2007 | Postrel |
| 2007/0162337 A1 | 7/2007 | Hawkins et al. |
| 2007/0174116 A1 | 7/2007 | Keith et al. |
| 2007/0205274 A1 | 9/2007 | Bridges |
| 2007/0250380 A1 | 10/2007 | Mankoff |
| 2007/0288312 A1 | 12/2007 | Wang |
| 2008/0071614 A1 | 3/2008 | Mebruer |
| 2008/0154714 A1 | 6/2008 | Liu et al. |
| 2008/0195462 A1 | 8/2008 | Magdon-Ismail et al. |
| 2008/0195476 A1 | 8/2008 | Marchese et al. |
| 2009/0076912 A1 | 3/2009 | Rajan et al. |
| 2009/0319359 A1 | 12/2009 | Soza et al. |
| 2010/0042471 A1 | 2/2010 | Chang et al. |

OTHER PUBLICATIONS

Roper et al., "Method and System for Sharing Marketing Devices Based on Location Data," U.S. Appl. No. 13/218,144, filed Aug. 25, 2011.

Roth, "Get Rich Slowly: Personal Finance that Makes Cents", Mint.com, Nov. 14, 2007, 9 pages. [online]. Retrieved on Jan. 3, 2012 from URL: <http://www.getrichslowly.org/blog/2007>.

Trent, "The Simple Dollar," Simple Dollar Online Personal Financial Analysis Tools, Jan. 31, 2008, 4 pages [online]. Retrieved on Jan. 3, 2012 from URL:<http://www.thesimpledollar.com/2008/01/31/online-personal-finance-analysis-tools-some-thoughts-on-quicken-online-mint-and-wesabe/>.

No author provided, "Mint.com Free Personal Finance Web-app is Now Live," Mint.com, Oct. 2007, 8 pages [online], Retrieved from URL: <http://www.stopbuyingcrap.com/online-banking/mintcom-free-personal-finance-web-app-is-now-live/>.

No author provided, "Quicken 2006 Financial Planning Software," Official Quicken Site, 2 pages [online], Retrieved on Mar. 12, 2012 from URL: <http://web.archive.org/web/20051020000622/http://quicken.intuit.com/?>.

Brown, Mark Graham, "Journal for Quality & Participation," Oct./Nov. 1994, 11 pages, v17n6, Association for Quality & Participation.

Gadd, Ken W, "Business Process Re-Engineering & Management Journal," 1995, 15 pages, v1n3, MCB UP Limited.

No author provided, "Convergys Corp. Named Frost & Sullivan Award Recipient," Apr. 1, 2002, 4 pages, PR Newswire.

* cited by examiner

METHOD AND SYSTEM FOR USING CONSUMER FINANCIAL DATA IN PRODUCT MARKET ANALYSIS

BACKGROUND

Many providers of consumer goods and services, and other advertisers, herein also referred to as "product marketers", are very interested in determining, as precisely as possible, what consumer markets are most receptive to a given product or service. That is to say, many product marketers would like to establish a profile for the typical consumer who is interested in a given product and/or service and/or who actually purchases a given product and/or service.

To this end many product marketers have developed, and currently employ, various methods for obtaining information regarding consumers of their products and/or services. These methods include gathering survey information, such as part of a product/warranty registration materials/process, and then processing and/or sharing this survey information in an effort to establish a profile for a typical consumer of a given product and/or service. However, current methods for obtaining information from consumers for determining a relevant market for a given a product and/or service are often of limited value in that they typically require proactive consumer action, i.e., they require consumer time and energy. This often results in minimal consumer participation, and/or responses from only certain segments of consumers, typically those with time, energy, and/or a hidden agenda/motivation.

In addition, current methods for obtaining information about consumers for determining a relevant market for a given a product and/or service typically yields little or no information regarding consumers who were perhaps attracted to given product and/or service but who, for whatever reason, did not actually purchase the product and/or service.

Many of the same product marketers that are interested in determining what market is most receptive to a given product or service also attempt to identify and/or create markets through the use of marketing devices such as, but not limited to: advertisements, coupons, discount certificates, price guarantees, and vouchers. While traditionally, some of these marketing devices, such as coupons, have been distributed in "hard-copy", typically printed, form by various means, more recently, electronic media formats for marketing devices have been adopted.

These electronic media based marketing devices include, but are not limited to: screen pop-up/pop-up window advertisements and/or other marketing devices; search engine result based advertisements and/or other marketing devices; Vista operating system sidebar gadget advertisements and/or other marketing devices, and/or any sidebar display advertisements and/or other marketing devices; Internet browser plug-in advertisements and/or other marketing devices; pop-up link advertisements and/or other marketing devices; screen header, footer, sidebar, or frame displayed advertisements and/or other marketing devices; electronic attachment advertisements and/or other marketing devices; video and/or audio advertisements and/or other marketing devices; and/or any of various other advertisements and/or electronic media based marketing devices.

Typically, electronic media based marketing devices are distributed via: networks of computing systems, including public networks such as the Internet; web-sites; e-mail; cable television, satellite television, and/or "on demand" television services; data embedded in digital media such as DVDs, CDs, and MP3 files; data displayed in on-line digital media stores, such as iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device.

While these recently adopted electronic media based marketing devices have proved very effective for creating sales, from a market analysis perspective, i.e., for the purpose of determining, as precisely as possible, what market is most receptive to a given product or service, these electronic media based marketing device have yielded little additional insight into what "type" of consumers are attracted to given product and/or service. This is especially true if, for whatever reason, the consumer does not actually purchase the product and/or service.

As a result of the situation discussed above, product marketers are currently unable to accurately determine a profile of consumers that are attracted to given product and/or service and/or how effective a give marketing campaign is, i.e., how many potential consumers of a defined "type" are attracted to a given marketing device and/or product. Consequently, many marketing opportunities are lost and many marketing campaigns and strategies for a given product and/or service are directed to the wrong consumer market, with minimal opportunity for accurate feedback regarding the actual market for and product and/or service.

SUMMARY

In accordance with one embodiment, a system and method for product market analysis using consumer financial data includes a process for product market analysis using consumer financial data whereby consumer financial data associated with a given "consumer" is obtained from one or more sources. In one embodiment, at least part of the consumer financial data is then stored by the process for product market analysis using consumer financial data, of another party/application, typically in accounts/locations associated with the given consumer and/or based on identified consumer attributes associated with the given consumer. In one embodiment, a product marketer provides an electronic media based marketing device. In one embodiment, the electronic media based marketing device is capable of being activated, i.e., clicked through, by a consumer for further interaction with the electronic media based marketing device, including, in one embodiment, for obtaining further information regarding the product and/or service that is the subject of the electronic media based marketing device and/or to accept the offer of the electronic media based marketing device. In one embodiment, when a consumer activates the electronic media based marketing device, at least part of the consumer financial data associated with the consumer is transferred to the product marketer and/or the provider of the electronic media based marketing device and/or any authorized third party. Consequently, the product marketer can obtain significant amounts of information for market analysis purposes such as creating a potential consumer profile and determining a target market for the given product an/or service.

In one embodiment, the consumer financial data obtained from a given consumer is general financial data representing a given consumer's general and/or overall financial status and/or demographics, including, but not limited to: the consumer's income; the occupation/profession of the contribution consumer; the consumer's marital status and/or number of dependents; the consumer's area of residence/zip code; the consumer's total assets; details regarding one or more of the consumer's assets, such as the size and location of the consumer's house; the consumer's total liabilities/debt; the consumer's net worth; the consumer's average discretionary spending; details regarding the consumer's spending habits and monthly/recurring expenses; details regarding the consumer's spending habits with respect to specific products/services purchased; the consumer's age group; various demographic data regarding the consumer and/or the consumer's spending; and/or any other data regarding the consumer's general and/or overall financial status desired and/or available.

In one embodiment, the consumer financial data for a given consumer includes data regarding specific consumer financial transactions conducted by the consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available.

In one embodiment, the consumer financial data for a given consumer is obtained from one or more computing system implemented financial management systems as defined herein, and/or as known in the art the time of filing, and/or as developed after the time of filing.

In one embodiment, the given consumer agrees to share the consumer financial data with the process for product market analysis using consumer financial data, and/or product marketers, on a transaction-by-transaction approval basis. In one embodiment, the consumer agrees to share the consumer financial data with the process for product market analysis using consumer financial data, and/or product marketers, on a transaction category approval basis. In one embodiment, the consumer agrees to share the consumer financial data with the process for product market analysis using consumer financial data, and/or product marketers, without restriction. In other embodiments, the consumer agrees to share the consumer financial data with the process for product market analysis using consumer financial data, and/or product marketers, based on any restrictions/criteria defined by the consumer.

In one embodiment, the consumer financial data to be shared is tagged as sharable by the consumers using a user interface device such as a keyboard, mouse, touchpad, voice recognition system, or any other device capable of providing user input to a computing system and/or for translating user actions into computing system operations, whether available or known at the time of filing or as developed later.

In one embodiment, specific consumer financial transaction data is categorized by the consumer and one or more specific consumer financial transactions are associated by the consumer with a specific category, such as utilities, or clothing, or car/gas. In one embodiment, specific consumer financial transaction data is categorized by a computing system implemented financial management system, as defined herein, known at the time of filing, or as developed thereafter. In one embodiment, specific consumer financial transaction data is categorized by the process for product market analysis using consumer financial data and/or the provider of the process for product market analysis using consumer financial data.

In one embodiment, one or more consumer attributes associated with a given consumer are identified, in one embodiment using a given consumer's general and/or overall financial status and/or demographics data discussed above. In one embodiment, the one or more consumer attributes include, but are not limited to: the consumer's income; the occupation/profession of the contribution consumer; the consumer's marital status and/or number of dependents; the consumer's area of residence/zip code; the consumer's total assets; details regarding one or more of the consumer's assets, such as the size and location of the consumer's house; the consumer's total liabilities/debt; the consumer's net worth; the consumer's average discretionary spending; details regarding the consumer's spending habits and monthly/recurring expenses; details regarding the consumer's spending habits with respect to specific products/services purchased; the consumer's age group; various demographic data regarding the consumer and/or the consumer's spending; and/or any other data regarding the consumer's general and/or overall financial status desired and/or available.

In one embodiment, the consumer financial data is then stored by the process for product market analysis using consumer financial data, or another party/application, in a memory and/or database, as defined herein, known in the art at the time of filing, or as developed after the time of filing.

In one embodiment, a product marketer provides an electronic media based marketing device such as, but limited to: a screen pop-up/pop-up window advertisement and/or other marketing device; a search engine result based advertisement and/or other marketing device; a Vista operating system operating system sidebar gadget advertisement and/or other marketing device, and/or any other sidebar display advertisement and/or other marketing device; an Internet browser plug-in advertisement and/or other marketing device; a pop-up link advertisement and/or other marketing device; a screen header, footer, sidebar, or frame displayed advertisement and/or other marketing device; an electronic attachment advertisement and/or other marketing device; a video and/or audio advertisement and/or other marketing device; and/or any other advertisement and/or electronic media based marketing device, as discussed herein, as known in the art at the time of filing, or as developed/made available after the time of filing.

In one embodiment, a product marketer distributes the electronic media based marketing device via: networks of computing systems, including public networks such as the Internet; web-sites; e-mail; cable television, satellite television, and/or "on demand" television services; data embedded in digital media such as DVDs, CDs, and MP3 files; data displayed in on-line digital media stores, such as iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device as discussed herein, as known in the art at the time of filing, or as developed/made available after the time of filing.

In one embodiment, the electronic media based marketing device is capable of being activated, i.e., clicked through, or on, by a consumer via user interface device such as a keyboard, mouse, touchpad, voice recognition system, or any other device capable of providing user input to a computing system and/or for translating user actions into computing system operations, whether available or known at the time of filing or as developed later.

In one embodiment, the electronic media based marketing device is activated, i.e., clicked through, or on, by a consumer for further interaction with the electronic media based marketing device, and/or to obtain more information regarding the product and/or service that is the subject of the electronic media based marketing device, and/or to obtain further information regarding the offer of electronic media based marketing device, and/or to accept the offer of the electronic media based marketing device.

In one embodiment, when a given consumer activates the electronic media based marketing device, that fact is made known to product marketer and/or at least part of the consumer financial data associated with the given consumer is made available to the product marketer and/or the provider of the electronic media based marketing device and/or any authorized third party via a network and/or by any method, apparatus, process or mechanism for transferring/providing access to data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, the product marketer uses the consumer financial data associated with each consumer that activates the electronic media based marketing device to perform market analysis. For instance, in one embodiment, the product marketer uses the consumer financial data associated with each consumer that activates the electronic media based marketing device to create a potential consumer profile. In one embodiment, the product marketer uses the consumer financial data associated with each consumer that activates the electronic media based marketing device to determine a target market for the given product an/or service. In one embodiment, the product marketer uses the consumer financial data associated with each consumer that activates the electronic media based marketing device to determine the validity of market analysis assumptions made when formulating a marketing campaign. In one embodiment, the product marketer uses the consumer financial data associated with each consumer that activates the electronic media based marketing device for any purpose desired by, and considered of value to, the product marketer.

Using the system and method for product market analysis using consumer financial data disclosed herein, a product marketer is provided consumer financial data associated with each consumer that is at least attracted enough to a given product an/or service to activate an electronic media based marketing device. Consequently, using the system and method for product market analysis using consumer financial data disclosed herein, the product marketer can obtain significant amounts of information for market analysis purposes such as creating a potential consumer profile and determining a correct target market for the given product an/or service, all without the need for any significant consumer input, actions, and/or time.

Figure 1:
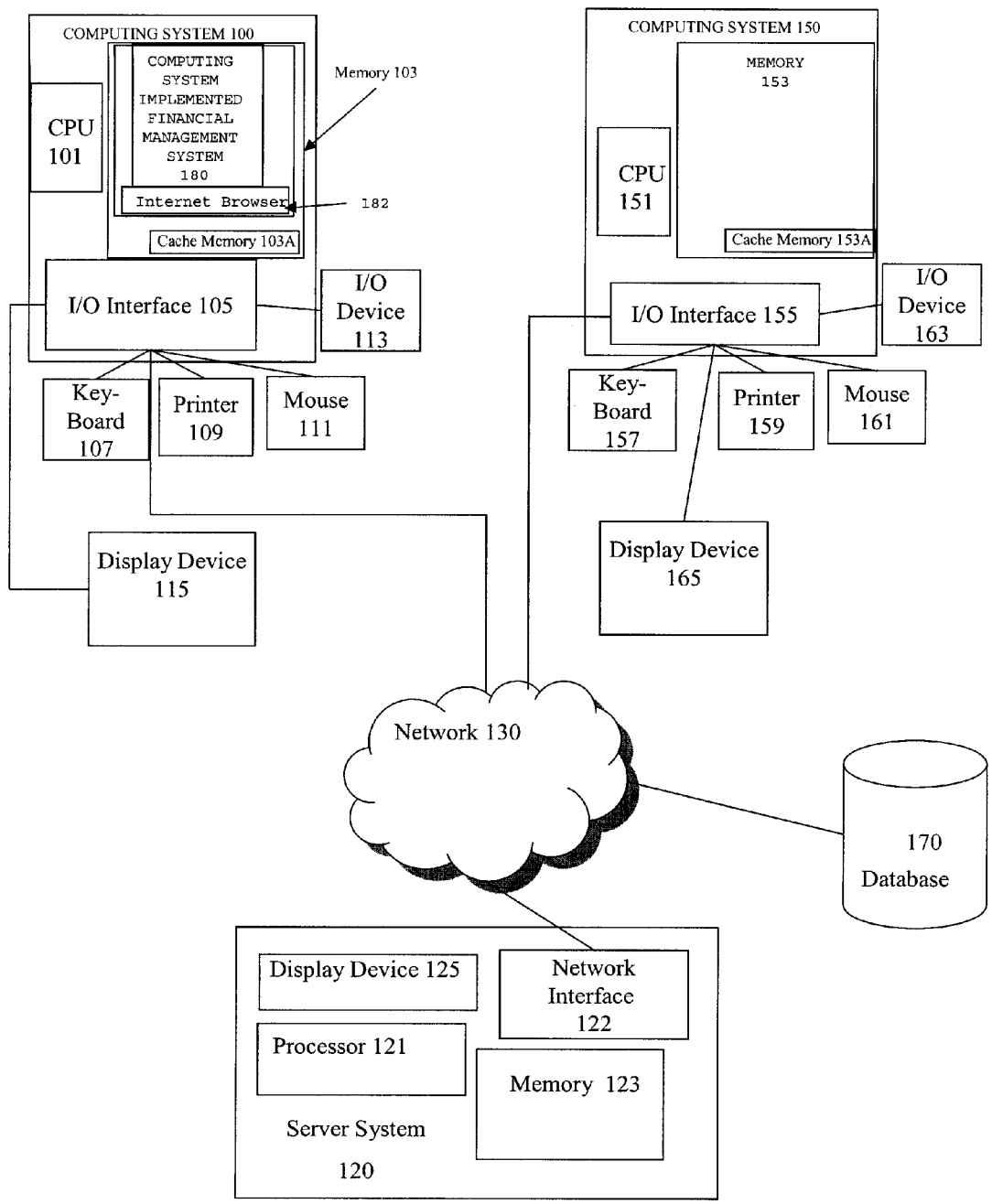
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for product market analysis using consumer financial data includes a process for product market analysis using consumer financial data whereby consumer financial data associated with a given "consumer" is obtained from one or more sources. In one embodiment, at least part of the consumer financial data is then stored by the process for product market analysis using consumer financial data or another party/application, typically in accounts/locations associated with the given consumer and/or based on identified consumer attributes associated with the given consumer. In one embodiment, a product marketer provides an electronic media based marketing device. In one embodiment, the electronic media based marketing device is capable of being activated, i.e., clicked through, by a consumer for further interaction with the electronic media based marketing device, including, in one embodiment, for obtaining further information regarding the product and/or service that is the subject of the electronic media based marketing device and/or to accept the offer of the electronic media based marketing device. In one embodiment, when a consumer activates the electronic media based marketing device, at least part of the consumer financial data associated with the consumer is transferred to the product marketer and/or the provider of the electronic media based marketing device and/or any authorized third party. Consequently, the product marketer can obtain significant amounts of information for market analysis purposes such as creating a potential consumer profile and determining a target market for the given product an/or service.

Hardware System Architecture

FIG. 1 is a block diagram of an exemplary hardware architecture for implementing one embodiment of a system and method for product market analysis using consumer financial data, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for product market analysis using consumer financial data, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for product market analysis using consumer financial data and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by a given consumer and/or users and used, and/or accessible, by another computing system, such as computing system 150 (discussed below). Computing systems 100 and 150 can be any computing system as defined herein and/or as known in the art at the time of filing and/or as developed thereafter, that includes components that can execute all, or part, of a process for product market analysis using consumer financial data, and/or a computing system implemented financial management system, in accordance with at least one of the embodiments as described herein.

In one embodiment, computing system 100 is used, controlled, and/or accessible by, a provider of and/or a system and process for product market analysis using consumer financial data and data representing all, or part, of financial data associated with a given consumer is stored in computing system 100, typically in accounts/locations associated with a given consumer. In one embodiment, computing system 100 is used, controlled, and/or accessible by, a provider of and/or a computing system implemented financial management system and data representing all, or part, of financial data associated with a given consumer is stored in computing system 100, typically in accounts/locations associated with a given consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more users and used, and/or accessible, by another computing system, such as computing system 100. In one embodiment, computing system 150 is used, controlled, and/or accessible by, a provider of and/or a system and process for product market analysis using consumer financial data and data representing all, or part, of data associated with one or more consumers is stored in computing system 150, typically in accounts/locations associated with a given consumer. In one embodiment, computing system 150 is used, controlled, and/or accessible by, a provider of and/or a computing system implemented financial management system and data representing all, or part, of financial data associated with one or more consumers is stored in computing system 150, typically in accounts/locations associated with a given consumer.

As discussed in more detail below, in one embodiment, all, or part of, a process for product market analysis using consumer financial data, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment. database 170 is a dedicated mass storage device implemented in software, hardware, or a combination of hardware and software. In one embodiment, database 170 includes a web-based function. As discussed in more detail below, in one embodiment, database 170 is under the control of a consumer, and/or the consumer's agents, a user, and/or the user's agents, and/or a process for product market analysis using consumer financial data, and/or a computing system implemented financial management system.

In one embodiment, database 170 is used, controlled, and/or accessible by, a provider of and/or a system and process for product market analysis using consumer financial data and data representing all, or part, of financial data associated with a given consumer is stored in database 170 (FIG. 1). In one embodiment, database 170 is used, controlled, and/or accessible by, a provider of and/or a computing system implemented financial management system and data representing all, or part, of financial data associated with a given consumer is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for product market analysis using consumer financial data and data representing all, or part, of financial data associated with a given consumer is stored in server system 120. In one embodiment, server system 120 is used, controlled, and/or accessible by, a provider of and/or a computing system implemented financial management system and data representing all, or part, of financial data associated with a given consumer is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for product market analysis using consumer financial data, and/or a computing system implemented financial management system, and/or financial data associated with a given consumer, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for product market analysis using consumer financial data, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for product market analysis using consumer financial data and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for product market analysis using consumer financial data, and/or a computing system implemented financial management system, and/or financial data associated with a given consumer, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "consumer" and "user consumer" are used interchangeable to denote any party and/or entity for whom, or from whom, consumer financial data is obtained by a process for product market analysis using consumer financial data, and/or a person and/or entity for whom, or from whom, consumer financial data is obtained by a process for product market analysis using consumer financial data, and/or a legal guardian of person and/or entity for whom, or from whom, consumer financial data is obtained by a process for product market analysis using consumer financial data, and/or an authorized agent of any party and/or person and/or entity for whom, or from whom, consumer financial data is obtained by a process for product market analysis using consumer financial data.

Herein, the term "product marketer" denotes providers of consumer goods and services, and other advertisers, and/or any party and/or entity that interfaces with, and/or to whom information is provided by, a process for product market analysis using consumer financial data, and/or a person and/or entity that interfaces with, and/or to whom information is provided by, a process for product market analysis using consumer financial data, and/or a legal guardian of person and/or entity that interfaces with, and/or to whom information is provided by, a process for product market analysis using consumer financial data, and/or an authorized agent of any party and/or person and/or entity that interfaces with, and/or to whom information is provided by, a process for product market analysis using consumer financial data.

Herein, the term "marketing device" is used to denote advertisements, coupons, discount certificates, discount vouchers, sales offers, and/or any other marketing tool and/or device and/or offer that is presented, and/or offered to, and/or obtained by, a consumer.

Herein, the term "electronic media based marketing device" is used to denote any marketing device distributed primarily, and/or initially, through an electronic means such as, but not limited to: networks of computing systems, including public networks such as the Internet and/or web-sites; e-mail; cable television, satellite television, and "on demand" television services; data embedded in digital media such as DVDs, CDs, and MP3 files; data displayed in on-line digital media stores, such as iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device as discussed herein, as known in the art at the time of filing, or as developed/made available after the time of filing. As an example, as used herein, an "electronic media based marketing device" can be, but is not limited to, any one of the following: a screen pop-up/pop-up window advertisement and/or other marketing device; a search engine result based advertisement and/or other marketing device; a Vista operating system sidebar gadget advertisement and/or other marketing device, and/or any other sidebar display advertisement and/or other marketing device; an Internet browser plug-in advertisement and/or other marketing device; a pop-up link advertisement and/or other marketing device; a screen header, footer, sidebar, or frame displayed advertisement and/or other marketing device; an electronic attachment advertisement and/or other marketing device; a video and/or audio advertisement and/or other marketing device; and/or any other advertisement and/or electronic media based marketing device, as discussed herein, as known in the art at the time of filing, or as developed/made available after the time of filing.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a cellular network, an MAN, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for product market analysis using consumer financial data includes a process for product market analysis using consumer financial data whereby consumer financial data associated with a given "consumer" is obtained from one or more sources. In one embodiment, at least part of the consumer financial data is then stored by the process for product market analysis using consumer financial data, or another party/application, typically in accounts/locations associated with the given consumer and/or based on identified consumer attributes associated with the given consumer. In one embodiment, a product marketer provides an electronic media based marketing device. In one embodiment, the electronic media based marketing device is capable of being activated by a consumer for further interaction with the electronic media based marketing device, including, in one embodiment, for obtaining further information regarding the product and/or service that is the subject of the electronic media based marketing device and/or to accept the offer of the electronic media based marketing device. In one embodiment, when a consumer activates the electronic media based marketing device, at least part of the consumer financial data associated with the consumer is provided to the product marketer and/or the provider of the electronic media based marketing device and/or any authorized third party. Consequently, the product marketer can obtain significant amounts of information for market analysis purposes such as creating a potential consumer profile and determining a target market for the given product an/or service.

Figure 2:
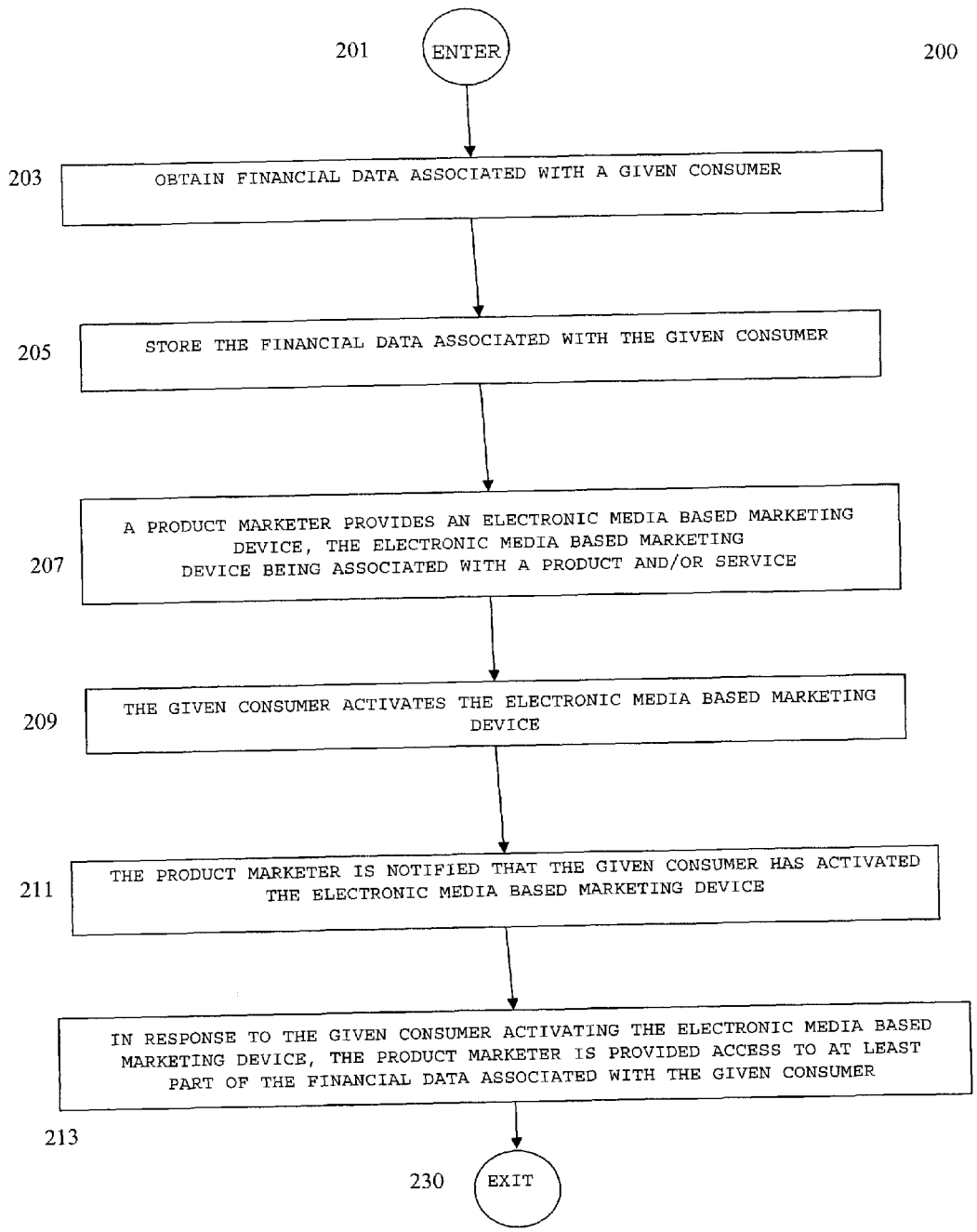
FIG. 2 is a flow chart depicting a process for product market analysis using consumer financial data in accordance with one embodiment.

FIG. 2 is a flow chart depicting a process for product market analysis using consumer financial data 200 in accordance with one embodiment. Process for product market analysis using consumer financial data 200 begins at ENTER OPERATION 201 of FIG. 2 and process flow proceeds to OBTAIN FINANCIAL DATA ASSOCIATED WITH A GIVEN CONSUMER OPERATION 203.

In one embodiment, at OBTAIN FINANCIAL DATA ASSOCIATED WITH A GIVEN CONSUMER OPERATION 203 financial data associated with one or more "consumers", herein also referred to as "consumer financial data", is obtained from one or more sources.

In one embodiment, at OBTAIN FINANCIAL DATA ASSOCIATED WITH A GIVEN CONSUMER OPERATION 203 the consumers agree to share the consumer financial data with process for product market analysis using consumer financial data 200 and/or one or more "product marketers" by any one of various means, including, tagging specific financial data as sharable data. In one embodiment, the consumer financial data includes data associated with specific consumer financial transactions and, in one embodiment, the specific consumer financial transactions are tagged as sharable by the consumers. In one embodiment, the specific consumer financial transactions are categorized by the consumers and/or associated with a specific type of expense/income.

In one embodiment, at OBTAIN FINANCIAL DATA ASSOCIATED WITH A GIVEN CONSUMER OPERATION 203, the consumer financial data obtained from a given consumer includes general financial data obtained from the consumer representing a given consumer's general and/or overall financial status and/or demographics, including, but not limited to: the consumer's occupation/profession; the status of the consumer as a business owner/operator or an employee; the consumer's marital status and/or number of dependents; the consumer's area of residence/zip code; the consumer's total assets; details regarding one or more of the consumer's assets, such as the size and location of the consumer's house and/or the type of car the consumer drives; the consumer's total income and/or the percentage of the consumer's income spent in a given category of financial data; the consumer's net worth; the consumer's average discretionary spending and/or the percentage of the consumer's discretionary spending spent in a given category of consumer financial data; the consumer's age group; various demographic data regarding the consumer and/or the consumer's spending; the consumer's commute; the consumer's yearly mileage; and/or any other data regarding the consumer's general and/or overall financial status desired and/or available.

In one embodiment, as discussed below, the consumer's general and/or overall financial status and/or demographics data is used to identify one or more consumer attributes associated with a given consumer, and to categorize their consumer financial data, according to the identified one or more consumer attributes.

In one embodiment, at OBTAIN FINANCIAL DATA ASSOCIATED WITH A GIVEN CONSUMER OPERATION 203 the consumer financial data associated with a given consumer represents one or more consumer financial transactions conducted by a given consumer. In one embodiment, at OBTAIN FINANCIAL DATA ASSOCIATED WITH A GIVEN CONSUMER OPERATION 203 the consumer financial data representing various consumer financial transactions conducted by the consumer includes, but is not limited to, data representing: dates of specific consumer financial transactions; payees/payers associated with specific consumer financial transactions; categories of specific consumer financial transactions, such as the expense category assigned to a given specific consumer financial transaction; total expenditures in specific consumer financial transaction categories over designated time frames; specific items purchased through specific consumer financial transactions; the geographic location of specific consumer financial transactions; the geographic location where one or more services and/or products associated with specific consumer financial transactions are used/delivered; and/or any other data regarding specific consumer financial transactions desired and/or available.

In one embodiment, at OBTAIN FINANCIAL DATA ASSOCIATED WITH A GIVEN CONSUMER OPERATION 203 at least part of the consumer financial data associated with a given consumer is obtained by process for product market analysis using consumer financial data 200 using, and/or through, and/or from, a computing system implemented financial management system, as defined herein, known in the art at the time of filing, or as developed after the time of filing.

In one embodiment, the consumer financial data associated with a given consumer obtained at OBTAIN FINANCIAL DATA ASSOCIATED WITH A GIVEN CONSUMER OPERATION 203 includes data associated with consumer financial transactions conducted using multiple payment methods and/or accounts to provide as complete a set of consumer financial data as possible. For instance, in one embodiment, the consumer financial data associated with a given consumer is obtained at OBTAIN FINANCIAL DATA ASSOCIATED WITH A GIVEN CONSUMER OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a consumer to pay for and/or conduct consumer financial transactions.

In addition, in some embodiments, the consumer financial data associated with a given consumer obtained at OBTAIN FINANCIAL DATA ASSOCIATED WITH A GIVEN CONSUMER OPERATION 203 is obtained from multiple sources of the same type. For instance, in one embodiment, the consumer financial data associated with a given consumer is obtained at OBTAIN FINANCIAL DATA ASSOCIATED WITH A GIVEN CONSUMER OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a consumer to pay for and/or conduct consumer financial transactions.

As noted above, in one embodiment, all, or part, of the consumer financial data associated with a given consumer is obtained by process for product market analysis using consumer financial data 200 at OBTAIN FINANCIAL DATA ASSOCIATED WITH A GIVEN CONSUMER OPERATION 203 from, or using, a computing system implemented financial management system, such as computing system implemented financial management system 180 (FIG. 1), that implements, includes, is accessed by, and/or is otherwise associated with process for product market analysis using consumer financial data 200 (FIG. 2).

Currently, various computing system implemented financial management systems are available as defined herein. Computing system implemented financial management systems typically help users/consumers manage their finances by providing a centralized interface with banks, credit card companies, and other various financial institutions and/or accounts, for identifying, processing, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, user defined category of the financial transaction, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the consumer financial data associated with a given consumer obtained using one or more computing system implemented financial management systems is transferred, or otherwise made available to, process for product market analysis using consumer financial data 200 at OBTAIN FINANCIAL DATA ASSOCIATED WITH A GIVEN CONSUMER OPERATION 203.

In one embodiment, all, or part, of the consumer financial data associated with a given consumer is obtained by process for product market analysis using consumer financial data 200 at OBTAIN FINANCIAL DATA ASSOCIATED WITH A GIVEN CONSUMER OPERATION 203 from invoices/bills and/or receipt data provided to process for product market analysis using consumer financial data 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for product market analysis using consumer financial data 200 is associated with a computing system implemented financial management system, such as computing system implemented financial management system 180 of FIG. 1, that implements, includes, is accessed by, and/or is otherwise associated with process for product market analysis using consumer financial data 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for product market analysis using consumer financial data 200 in one of numerous locations by one of numerous methods known to those of skill in the art and/or as discussed herein.

In one embodiment, all, or part, of the consumer financial data associated with a given consumer is obtained by process for product market analysis using consumer financial data 200, and/or a computing system implemented financial management system, at OBTAIN FINANCIAL DATA ASSOCIATED WITH A GIVEN CONSUMER OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct consumer financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct consumer financial transactions.

In one embodiment, all, or part, of the consumer financial data associated with a given consumer is obtained by process for product market analysis using consumer financial data 200 at OBTAIN FINANCIAL DATA ASSOCIATED WITH A GIVEN CONSUMER OPERATION 203 from consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the consumer financial data associated with a given consumer is obtained by process for product market analysis using consumer financial data 200 at OBTAIN FINANCIAL DATA ASSOCIATED WITH A GIVEN CONSUMER OPERATION 203 from any combination of the above sources and/or from any other source of consumer financial data associated with a given consumer whether known at the time of filing or as developed thereafter.

As noted above, in one embodiment, at OBTAIN FINANCIAL DATA ASSOCIATED WITH A GIVEN CONSUMER OPERATION 203 the consumers agree to share all or part of their consumer financial data with process for product market analysis using consumer financial data 200 and/or one or more "product marketers" by any one of various means, including, tagging specific financial data as sharable data.

In one embodiment, at OBTAIN FINANCIAL DATA ASSOCIATED WITH A GIVEN CONSUMER OPERATION 203 the consumers agree to share the consumer financial data with process for product market analysis using consumer financial data 200 and/or one or more "product marketers" on a transaction-by-transaction approval basis. In one embodiment, at OBTAIN FINANCIAL DATA ASSOCIATED WITH A GIVEN CONSUMER OPERATION 203, the consumers agree to share the consumer financial data with process for product market analysis using consumer financial data 200 and/or one or more product marketers on a financial data category approval basis. In one embodiment, at OBTAIN FINANCIAL DATA ASSOCIATED WITH A GIVEN CONSUMER OPERATION 203 the consumers agree to share the consumer financial data with process for product market analysis using consumer financial data 200 and/or one or more product marketers without restriction. In other embodiments, at OBTAIN FINANCIAL DATA ASSOCIATED WITH A GIVEN CONSUMER OPERATION 203 the consumers agree to share the consumer financial data with process for product market analysis using consumer financial data 200 and/or one or more product marketers based on any restrictions/criteria dictated by the consumer.

In one embodiment, at OBTAIN FINANCIAL DATA ASSOCIATED WITH A GIVEN CONSUMER OPERATION 203, the consumer financial data to be shared is tagged as sharable by the consumers using a user interface display and a user interface device, such as those defined herein, known in the art, or developed after the time of filing.

In one embodiment, specific consumer financial transaction data is assigned a category/name and/or a description by the consumer and one or more specific consumer financial transactions are associated by the consumer with a specific type of expense, such as utilities, or home maintenance, or transportation.

In one embodiment, specific consumer financial transaction data is categorized by a computing system implemented financial management system, as defined herein, known at the time of filing, or as developed thereafter. In one embodiment, specific consumer financial transaction data is categorized by process for product market analysis using consumer financial data 200 and/or the provider of process for product market analysis using consumer financial data 200.

In one embodiment, at OBTAIN FINANCIAL DATA ASSOCIATED WITH A GIVEN CONSUMER OPERATION 203 one or more consumer attributes associated with a given consumer are identified, in one embodiment, using a given consumer's general and/or overall financial status and/or demographics data. In one embodiment, the one or more consumer attributes associated with a given consumer identified at OBTAIN FINANCIAL DATA ASSOCIATED WITH A GIVEN CONSUMER OPERATION 203 include, but are not limited to: the consumer's occupation/profession; whether the consumer is a business owner/operator or an employee; the consumer's marital status and/or number of dependents; the consumer's area of residence/zip code; the consumer's total assets; details regarding one or more of the consumer's assets, such as the size and location of the consumer's house; the consumer's total liabilities/debt; the consumer's net worth; the consumer's average discretionary spending; details regarding the consumer's spending habits and monthly/recurring expenses; the consumer's age group; various demographic data regarding the consumer and/or the consumer's spending; the consumer's commute; and/or any other data regarding the consumer's general and/or overall financial status desired and/or available.

As noted, in one embodiment, the one or more consumer attributes associated with a given consumer are identified using a given consumer's general and/or overall financial status and/or demographics data obtained at OBTAIN FINANCIAL DATA ASSOCIATED WITH A GIVEN CONSUMER OPERATION 203. In one embodiment, the one or more consumer attributes associated with a given consumer are identified/provided by the consumer themselves, in one embodiment, using a user interface device such as those discussed herein, known in the art at the time of filing, or as developed thereafter.

Methods, means, processes, procedures and mechanisms for analyzing, aggregating, and categorizing data according to various parameters/criteria are well known in the art. Consequently, a more detailed discussion of any specific methods, means, processes, procedures and mechanisms for analyzing, aggregating, and categorizing data, such as, in one embodiment, is performed at OBTAIN FINANCIAL DATA ASSOCIATED WITH A GIVEN CONSUMER OPERATION 203, is omitted here to avoid detracting from the invention.

In one embodiment, once financial data associated with one or more consumers is obtained from one or more sources and/or one or more consumer attributes associated with a given consumer are identified at OBTAIN FINANCIAL DATA ASSOCIATED WITH A GIVEN CONSUMER OPERATION 203, process flow proceeds to STORE THE FINANCIAL DATA ASSOCIATED WITH THE GIVEN CONSUMER OPERATION 205.

In one embodiment, at STORE THE FINANCIAL DATA ASSOCIATED WITH THE GIVEN CONSUMER OPERATION 205, at least part of the consumer financial data of OBTAIN FINANCIAL DATA ASSOCIATED WITH A GIVEN CONSUMER OPERATION 203 is stored by, or under the control of, process for product market analysis using consumer financial data 200, typically in accounts/locations associated with the given consumer and/or based on the identified consumer attributes associated with the given consumer of OBTAIN FINANCIAL DATA ASSOCIATED WITH A GIVEN CONSUMER OPERATION 203.

In one embodiment, at STORE THE FINANCIAL DATA ASSOCIATED WITH THE GIVEN CONSUMER OPERATION 205, the consumer financial data is stored in whole, or in part, in a database maintained by, accessible by, owned by, or otherwise related to: process for product market analysis using consumer financial data 200, and/or a provider of process for product market analysis using consumer financial data 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer financial data stored as described above is maintained, in whole, or in part, by: process for product market analysis using consumer financial data 200, and/or a provider of process for product market analysis using consumer financial data 200; a computing system implemented financial management system, and/or a provider of a computing system implemented financial management system; one or more product marketers; a third party data storage institution; any third party service or institution; or any other parties. In one embodiment, access to the consumer financial data is provided to process for product market analysis using consumer financial data 200, and/or a computing system implemented financial management system, by providing access to the data and/or providing the data on a computer program product.

In one embodiment, once at least part of the consumer financial data of OBTAIN FINANCIAL DATA ASSOCIATED WITH A GIVEN CONSUMER OPERATION 203 is stored by, or under the control of, process for product market analysis using consumer financial data 200, at STORE THE FINANCIAL DATA ASSOCIATED WITH THE GIVEN CONSUMER OPERATION 205, process flow proceeds to A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207.

In one embodiment, at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 a product marketer provides an electronic media based marketing device.

In one embodiment, the electronic media based marketing device provided by the product marketer at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 is any one of various electronic media based marketing devices such as, but limited to: a screen pop-up/pop-up window advertisement and/or other marketing device; a search engine result based advertisement and/or other marketing device; a Vista operating system sidebar gadget advertisement and/or other marketing device, and/or any other sidebar display advertisement and/or other marketing device; an Internet browser plug-in advertisement and/or other marketing device; a pop-up link advertisement and/or other marketing device; a screen header, footer, sidebar, or frame displayed advertisement and/or other marketing device; an electronic attachment advertisement and/or other marketing device; a video and/or audio advertisement and/or other marketing device; and/or any other advertisement and/or electronic media based marketing device, as discussed herein, as known in the art at the time of filing, or as developed/made available after the time of filing.

In one embodiment, the electronic media based marketing device is provided by the product marketer at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 via, but not limited to, any one of the following: networks of computing systems, including public networks such as the Internet; web-sites; e-mail; cable television, satellite television, and/or "on demand" television services; data embedded in digital media such as DVDs, CDs, and MP3 files; data displayed in on-line digital media stores, such as iTunes; electronic attachments to electronic receipts; electronic attachments to transactional data, such as, but not limited to, transactional data from and/or displayed by, banks, credit card companies, and other financial institutions; and/or by any other method and/or mechanism for distributing an electronic media based marketing device as discussed herein, as known in the art at the time of filing, or as developed/made available after the time of filing.

In one embodiment, the electronic media based marketing device provided by the product marketer at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 is capable of being activated by a given consumer via a user interface device such as a keyboard, mouse, touchpad, voice recognition system, or any other device capable of providing user input to a computing system and/or for translating user actions into computing system operations, whether available or known at the time of filing or as developed later.

Examples of actions a given consumer could take to activate a given electronic media based marketing device include, but are not limited to: clicking on at least a portion of the electronic media based marketing device, i.e., clicking through, or on, the electronic media based marketing device; hovering a cursor over the electronic media based marketing device; voice commands directed to the electronic media based marketing device; pressing a menu and/or function key on a remote control device; accessing a channel and/or link associated with the electronic media based marketing device; or any other action/inaction on the part of the given consumer whereby a given electronic media based marketing device is activated, discussed herein, known/available in the art at the time of filing, or as developed after the time of filing.

Methods, means, processes, procedures and mechanisms for creating, operating, distributing, displaying, and/or interacting with, electronic media based marketing devices are well known in the art. Consequently, a more detailed discussion of any specific methods, means, processes, procedures and mechanisms for creating, operating, distributing, displaying, and/or interacting with, electronic media based marketing devices, such as, in one embodiment, is performed at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207, is omitted here to avoid detracting from the invention.

In one embodiment, once a product marketer provides an electronic media based marketing device at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207, process flow proceeds to THE GIVEN CONSUMER ACTIVATES THE ELECTRONIC MEDIA BASED MARKETING DEVICE OPERATION 209.

In one embodiment, at THE GIVEN CONSUMER ACTIVATES THE ELECTRONIC MEDIA BASED MARKETING DEVICE OPERATION 209 the electronic media based marketing device provided to a given consumer at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 is activated by the given consumer.

As noted above, in one embodiment, at THE GIVEN CONSUMER ACTIVATES THE ELECTRONIC MEDIA BASED MARKETING DEVICE OPERATION 209 the electronic media based marketing device provided to a given consumer at A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 is activated by the given consumer via a user interface device such as a keyboard, mouse, touchpad, voice recognition system, or any other device capable of providing user input to a computing system and/or for translating user actions into computing system operations, as discussed herein, available or known at the time of filing, or as developed after the time of filing.

As also noted above, examples of actions a given consumer could take at THE GIVEN CONSUMER ACTIVATES THE ELECTRONIC MEDIA BASED MARKETING DEVICE OPERATION 209 to activate a given electronic media based marketing device include, but are not limited to: clicking on at least a portion of the electronic media based marketing device, i.e., clicking through, or on, the electronic media based marketing device; hovering a cursor over the electronic media based marketing device; voice commands directed to the electronic media based marketing device; pressing a menu and/or function key on a remote control device; accessing a channel and/or link associated with the electronic media based marketing device; or any other action/inaction on the part of the given consumer whereby a given electronic media based marketing device is activated.

In one embodiment, at THE GIVEN CONSUMER ACTIVATES THE ELECTRONIC MEDIA BASED MARKETING DEVICE OPERATION 209 the given consumer activates the electronic media based marketing device of A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 for further interaction with the electronic media based marketing device. For instance, in one embodiment, at THE GIVEN CONSUMER ACTIVATES THE ELECTRONIC MEDIA BASED MARKETING DEVICE OPERATION 209 the given consumer activates the electronic media based marketing device to obtain more information regarding the product and/or service that is the subject of the electronic media based marketing device. In other instances, at THE GIVEN CONSUMER ACTIVATES THE ELECTRONIC MEDIA BASED MARKETING DEVICE OPERATION 209 the given consumer activates the electronic media based marketing device to obtain further information regarding the offer of electronic media based marketing device. In some instances, at THE GIVEN CONSUMER ACTIVATES THE ELECTRONIC MEDIA BASED MARKETING DEVICE OPERATION 209 the given consumer activates the electronic media based marketing device to accept the offer of the electronic media based marketing device. In some instances, at THE GIVEN CONSUMER ACTIVATES THE ELECTRONIC MEDIA BASED MARKETING DEVICE OPERATION 209 the given consumer activates the electronic media based marketing device for any of numerous reasons.

In one embodiment, when the given consumer activates the electronic media based marketing device at THE GIVEN CONSUMER ACTIVATES THE ELECTRONIC MEDIA BASED MARKETING DEVICE OPERATION 209, for any reason, it is assumed the given consumer is interested in the product and/or service that is the subject of the electronic media based marketing device and/or the offer represented by the electronic media based marketing device. Therefore, the given consumer is considered a potential consumer of the electronic media based marketing device. Consequently, information about a given consumer that activates the electronic media based marketing device at THE GIVEN CONSUMER ACTIVATES THE ELECTRONIC MEDIA BASED MARKETING DEVICE OPERATION 209 is considered of particular interest to the product marketer.

In one embodiment, once the given consumer activates the electronic media based marketing device at THE GIVEN CONSUMER ACTIVATES THE ELECTRONIC MEDIA BASED MARKETING DEVICE OPERATION 209, process flow proceeds to THE PRODUCT MARKETER IS NOTI- FIED THAT THE GIVEN CONSUMER HAS ACTIVATED THE ELECTRONIC MEDIA BASED MARKETING DEVICE OPERATION 211.

In one embodiment, at THE PRODUCT MARKETER IS NOTIFIED THAT THE GIVEN CONSUMER HAS ACTIVATED THE ELECTRONIC MEDIA BASED MARKETING DEVICE OPERATION 211, the fact that the given customer has activated the electronic media based marketing device at THE GIVEN CONSUMER ACTIVATES THE ELECTRONIC MEDIA BASED MARKETING DEVICE OPERATION 209 is relayed to, and/or stored for further correlation by, the product marketer.

As noted above, in one embodiment, when the given consumer activates the electronic media based marketing device at THE GIVEN CONSUMER ACTIVATES THE ELECTRONIC MEDIA BASED MARKETING DEVICE OPERATION 209, for any reason, it is assumed the given consumer is interested in the product and/or service that is the subject of the electronic media based marketing device and/or the offer represented by the electronic media based marketing device, and is therefore a potential consumer of the electronic media based marketing device. Consequently, information about a given consumer that activates the electronic media based marketing device at THE GIVEN CONSUMER ACTIVATES THE ELECTRONIC MEDIA BASED MARKETING DEVICE OPERATION 209 is of particular interest to the product marketer.

In one embodiment, the product marketer is immediately, and/or automatically, made aware that the given consumer has activated the electronic media based marketing device at THE GIVEN CONSUMER ACTIVATES THE ELECTRONIC MEDIA BASED MARKETING DEVICE OPERATION 209 by virtue of the given customer activating the electronic media based marketing device. In one embodiment, data indicating the fact that the given consumer has activated the electronic media based marketing device at THE GIVEN CONSUMER ACTIVATES THE ELECTRONIC MEDIA BASED MARKETING DEVICE OPERATION 209 is automatically stored by virtue of the given customer activating the electronic media based marketing device using any of the storage means and/or mechanisms discussed herein, known in the art, or as developed after the time filing. In one embodiment, the data indicating the fact that the given consumer has activated the electronic media based marketing device is then provided to, accessed by, and/or transferred to the product marketer.

In one embodiment, once the fact that the given customer has activated the electronic media based marketing device at THE GIVEN CONSUMER ACTIVATES THE ELECTRONIC MEDIA BASED MARKETING DEVICE OPERATION 209 is relayed to, and/or stored for further correlation by, the product marketer at THE PRODUCT MARKETER IS NOTIFIED THAT THE GIVEN CONSUMER HAS ACTIVATED THE ELECTRONIC MEDIA BASED MARKETING DEVICE OPERATION 211, process flow proceeds to IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213, at least part of the consumer financial data associated with the given consumer is made available to the product marketer and/or any authorized third party.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213, in response to the given consumer activating the electronic media based marketing device at THE GIVEN CONSUMER ACTIVATES THE ELECTRONIC MEDIA BASED MARKETING DEVICE OPERATION 209, at least part of the consumer financial data associated with the given consumer of OBTAIN FINANCIAL DATA ASSOCIATED WITH A GIVEN CONSUMER OPERATION 203 is transferred to the product marketer of A PRODUCT MARKETER PROVIDES AN ELECTRONIC MEDIA BASED MARKETING DEVICE, THE ELECTRONIC MEDIA BASED MARKETING DEVICE BEING ASSOCIATED WITH A PRODUCT AND/OR SERVICE OPERATION 207 and/or any authorized third party.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 at least part of the consumer financial data associated with the given consumer is transferred to the product marketer via a network and/or one or more computing systems, such as those defined and discussed herein, known in the art at the time of filing, or as developed after the time of filing.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 at least part of the consumer financial data associated with the given consumer is transferred to the product marketer via e-mail, text messaging, video transfer, audio transfer, etc. by any means, such as those defined and discussed herein, known in the art at the time of filing, or as developed after the time of filing In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 at least part of the consumer financial data associated with the given consumer is transferred to a database, such as discussed herein, known at the time of filing, or as developed thereafter, and the product marketer is provided access to the data at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 at least part of the consumer financial data associated with the given consumer is transferred to a computer program product, as discussed and defined herein, known at the time of filing, or as developed thereafter, and the product marketer is provided access to the data at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 by providing the product marketer the data via the computer program product.

In one embodiment, at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 at least part of the consumer financial data associated with the given consumer is provided to the product marketer by any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, the consumer financial data associated with the given consumer provided to the product marketer at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 is used by the product marketer to perform market analysis. For instance, in one embodiment, the product marketer uses the consumer financial data associated with each consumer that activates the electronic media based marketing device to create a potential consumer profile. In one embodiment, the product marketer uses the consumer financial data associated with each consumer that activates the electronic media based marketing device to determine a target market for the given product an/or service. In one embodiment, the product marketer uses the consumer financial data associated with each consumer that activates the electronic media based marketing device to determine the validity of market analysis assumptions made when formulating a marketing campaign. In one embodiment, the product marketer uses the consumer financial data associated with each consumer that activates the electronic media based marketing device for any purpose desired by, and considered of value to, the product marketer.

In one embodiment, once at least part of the consumer financial data associated with the given consumer is provided to the product marketer and/or any authorized third party at IN RESPONSE TO THE GIVEN CONSUMER ACTIVATING THE ELECTRONIC MEDIA BASED MARKETING DEVICE, THE PRODUCT MARKETER IS PROVIDED ACCESS TO AT LEAST PART OF THE FINANCIAL DATA ASSOCIATED WITH THE GIVEN CONSUMER OPERATION 213 process flow proceeds to EXIT OPERATION 230. In one embodiment, at EXIT OPERATION 230, process for product market analysis using consumer financial data 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for product market analysis using consumer financial data 200, a product marketer is provided consumer financial data associated with each consumer that is at least attracted enough to a given product an/or service to activate an electronic media based marketing device. Consequently, using process for product market analysis using consumer financial data 200, the product marketer can obtain significant amounts of information for market analysis purposes, such as creating a potential consumer profile and determining a correct target market for the given product an/or service, all without the need for any significant consumer input, actions, and/or time.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "obtaining", "identifying", "associating", "activating"; "initiating"; "collecting", "creating", "transferring", "storing", "searching", "notifying", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for sharing consumer financial data comprising:
    one or more computing processors; and
    one or more memories coupled to the one or more computing processors, the one or more memories having stored therein instructions which when executed by the one or more computing processors perform:
        obtaining consumer financial data from a bank associated with the given consumer, the consumer financial data being associated with a given consumer and comprising transaction data regarding a plurality of transactions of the given consumer, each transaction within the plurality of transactions being assigned a transaction category, each transaction category that has transactions which are to be shared with the process having been previously individually designated on a transaction category approval basis by the given consumer as being sharable with the process;
        a product marketer providing the given consumer an electronic media based marketing device, the electronic media based marketing device capable of being activated by the given consumer using a user interface device;
        the given consumer activating the electronic media based marketing device using the user interface device; and
        in response to the given consumer activating the electronic media based marketing device using the user interface device, sharing at least part of the consumer financial data of the designated sharable transaction categories with the product marketer.

2. The computing system implemented process for product market analysis using consumer financial data of claim 1, wherein;
    obtaining consumer financial data, the consumer financial data being associated with a given consumer comprises:
    obtaining at least part of the consumer financial data from a computing system implemented financial management system associated with the given consumer.

3. The computing system implemented process for product market analysis using consumer financial data of claim 2, wherein;
    at least part of the consumer financial data is categorized by the computing system implemented financial management system.

4. The computing system implemented process for product market analysis using consumer financial data of claim 1, wherein;
    at least part of the consumer financial data obtained includes consumer financial data indicating one or more of the consumer attributes selected from the group of consumer attributes consisting of:
    the consumer's occupation/profession;
    whether the consumer is a business owner/operator or an employee;
    the consumer's marital status and/or number of dependents;

the consumer's area of residence/zip code;
the consumer's total assets;
the types of assets a consumer owns;
the consumer's total liabilities/debt;
the consumer's net worth;
the consumer's average discretionary spending;
the consumer's spending habits and monthly/recurring expenses; and
the consumer's age group.

5. The computing system implemented process for product market analysis using consumer financial data of claim 1, wherein;
the product marketer is a provider of one or more products and/or services.

6. The computing system implemented process for product market analysis using consumer financial data of claim 1, wherein;
the electronic media based marketing device is an electronic media based marketing device selected from the group of electronic media based marketing devices consisting of:
a screen pop-up/pop-up window marketing device;
a search engine result based marketing device;
a Vista operating system sidebar gadget marketing device;
a sidebar display marketing device;
an Internet browser plug-in marketing device;
a pop-up link marketing device;
a screen header, footer, sidebar, or frame marketing device;
an electronic attachment marketing device;
a text message-based marketing device;
an SMS-based marketing device;
a video based marketing device; and
an audio based marketing device.

7. The computing system implemented process for product market analysis using consumer financial data of claim 1, wherein;
the electronic media based marketing device is provided to the given consumer using an electronic distribution media selected from the group of electronic distribution media consisting of:
a network of one or more computing systems;
a public network of one or more computing systems;
the Internet;
one or more web-sites;
e-mail;
cable television;
satellite television;
"on demand" television services;
data embedded in digital media such as DVDs, CDs, and MP3 files;
data displayed in on-line digital media stores;
electronic attachments to electronic receipts; and
electronic attachments to transactional data displayed by, banks, credit card companies, and other financial institutions.

8. The computing system implemented process for product market analysis using consumer financial data of claim 1, wherein;
the given consumer activating the electronic media based marketing device using the user interface device comprises the given user clicking on/through at least a portion of the electronic media based marketing device.

9. The computing system implemented process for product market analysis using consumer financial data of claim 1, wherein;
the given consumer activating the electronic media based marketing device using the user interface device comprises the given user moving a cursor over at least a portion of the electronic media based marketing device.

10. The computing system implemented process for product market analysis using consumer financial data of claim 1, wherein;
providing the product marketer at least part of the consumer financial data associated with the given consumer comprises transferring at least part of the consumer financial data associated with the given consumer to a computing system associated with the product marketer.

11. The computing system implemented process for product market analysis using consumer financial data of claim 1, wherein;
providing the product marketer at least part of the consumer financial data associated with the given consumer comprises transferring at least part of the consumer financial data associated with the given consumer to a database and then providing the product marketer access to the data on the database.

12. The computing system implemented process for product market analysis using consumer financial data of claim 1, wherein;
providing the product marketer at least part of the consumer financial data associated with the given consumer comprises transferring at least part of the consumer financial data associated with the given consumer to a computer program product and then providing the product marketer access to the data on the computer program product.

13. The computing system implemented process for product market analysis using consumer financial data of claim 1, further comprising:
the product marketer using at least part of the consumer financial data associated with the given consumer for product market analysis for a product and/or service that is the subject of the electronic media based marketing device.

14. The computing system implemented process for product market analysis using consumer financial data of claim 1, further comprising:
the product marketer using at least part of the consumer financial data associated with the given consumer to create a potential consumer profile for a product and/or service that is the subject of the electronic media based marketing device.

15. A computer program product for providing a process for product market analysis using consumer financial data comprising:
a nontransitory computer readable medium;
and computer program code, encoded on the nontransitory computer readable medium, comprising computer readable instructions for:
obtaining consumer financial data from a bank associated with the given consumer, the consumer financial data being associated with a given consumer and comprising transaction data regarding a plurality of transactions of the given consumer, each transaction within the plurality of transactions being assigned a transaction category, each transaction category that has transactions which are to be shared with the process having been previously individually designated on a transaction category approval basis by the given consumer as being sharable with the process;
a product marketer providing the given consumer an electronic media based marketing device, the electronic media based marketing device capable of being activated by the given consumer using a user interface device;

the given consumer activating the electronic media based marketing device using the user interface device; and in response to the given consumer activating the electronic media based marketing device using the user interface device, providing the product marketer at least part of the consumer financial data associated with the given consumer.

16. The computer program product for providing a process for product market analysis using consumer financial data of claim 15, wherein;

obtaining consumer financial data, the consumer financial data being associated with a given consumer comprises:

obtaining at least part of the consumer financial data from a computing system implemented financial management system associated with the given consumer.

17. The computer program product for providing a process for product market analysis using consumer financial data of claim 15, wherein;

at least part of the consumer financial data obtained includes consumer financial data indicating one or more of the consumer attributes selected from the group of consumer attributes consisting of:

the consumer's occupation/profession;

whether the consumer is a business owner/operator or an employee;

the consumer's marital status and/or number of dependents;

the consumer's area of residence/zip code;

the consumer's total assets;

the types of assets a consumer owns;

the consumer's total liabilities/debt;

the consumer's net worth;

the consumer's average discretionary spending;

the consumer's spending habits and monthly/recurring expenses; and the consumer's age group.

18. The computer program product for providing a process for product market analysis using consumer financial data of claim 15, wherein;

the electronic media based marketing device is an electronic media based marketing device selected from the group of electronic media based marketing devices consisting of:

a screen pop-up/pop-up window marketing device;

a search engine result based marketing device;

a Vista operating system sidebar gadget marketing device;

a sidebar display marketing device;

an Internet browser plug-in marketing device;

a pop-up link marketing device;

a screen header, footer, sidebar, or frame marketing device;

an electronic attachment marketing device;

a text message-based marketing device;

an SMS-based marketing device;

a video based marketing device; and an audio based marketing device.

19. The computer program product for providing a process for product market analysis using consumer financial data of claim 15, wherein;

the electronic media based marketing device is provided to the given consumer using an electronic distribution media selected from the group of electronic distribution media consisting of:

a network of one or more computing systems;

a public network of one or more computing systems;

the Internet;

one or more web-sites;

e-mail;

cable television;

satellite television;

"on demand" television services;

data embedded in digital media such as DVDs, CDs, and MP3 files;

data displayed in on-line digital media stores;

electronic attachments to electronic receipts; and electronic attachments to transactional data displayed by, banks, credit card companies, and other financial institutions.

20. A system for product market analysis using consumer financial data comprising:

means for obtaining consumer financial data from a bank associated with the given consumer, the consumer financial data being associated with a given consumer and comprising transaction data regarding a plurality of transactions of the given consumer, each transaction within the plurality of transactions being assigned a transaction category, each transaction category that has transactions which are to be shared with the process having been previously individually designated on a transaction category approval basis by the given consumer as being sharable with the process;

means for a product marketer to provide the given consumer an electronic media based marketing device, the electronic media based marketing device capable of being activated by the given consumer using a user interface device;

means for the given consumer to activate the electronic media based marketing device using the user interface device; and means for providing the product marketer at least part of the consumer financial data associated with the given consumer in response to the given consumer activating the electronic media based marketing device using the user interface device.

21. The system for product market analysis using consumer financial data of claim 20, wherein;

the means for obtaining consumer financial data, the consumer financial data being associated with a given consumer comprises:

means for obtaining at least part of the consumer financial data from a computing system implemented financial management system associated with the given consumer.

22. The system for product market analysis using consumer financial data of claim 20, wherein;

at least part of the consumer financial data obtained includes consumer financial data indicating one or more of the consumer attributes selected from the group of consumer attributes consisting of:

the consumer's occupation/profession;

whether the consumer is a business owner/operator or an employee;

the consumer's marital status and/or number of dependents;

the consumer's area of residence/zip code;

the consumer's total assets;

the types of assets a consumer owns;

the consumer's total liabilities/debt;

the consumer's net worth;

the consumer's average discretionary spending;

the consumer's spending habits and monthly/recurring expenses; and the consumer's age group.

23. The system for product market analysis using consumer financial data of claim 20, wherein;
the electronic media based marketing device is an electronic media based marketing device selected from the group of electronic media based marketing devices consisting of:
a screen pop-up/pop-up window marketing device;
a search engine result based marketing device;
a Vista operating system sidebar gadget marketing device;
a sidebar display marketing device;
an Internet browser plug-in marketing device;
a pop-up link marketing device;
a screen header, footer, sidebar, or frame marketing device;
an electronic attachment marketing device;
a text message-based marketing device;
an SMS-based marketing device;
a video based marketing device; and
an audio based marketing device.

24. The system for product market analysis using consumer financial data of claim 20, wherein;
the means for a product marketer to provide the given consumer an electronic media based marketing device is selected from the group of means for a product marketer to provide the given consumer an electronic media based marketing device consisting of:
a network of one or more computing systems;
a public network of one or more computing systems;
the Internet;
one or more web-sites;
e-mail;
cable television;
satellite television;
"on demand" television services;
data embedded in digital media such as DVDs, CDs, and MP3 files;
data displayed in on-line digital media stores;
electronic attachments to electronic receipts; and
electronic attachments to transactional data displayed by, banks, credit card companies, and other financial institutions.

* * * * *